(12) United States Patent
McGee

(10) Patent No.: US 7,025,140 B2
(45) Date of Patent: Apr. 11, 2006

(54) LARGE PARTICULATE REMOVAL SYSTEM

(76) Inventor: Richard Harvey McGee, 9837 Windmill Park La., Houston, TX (US) 77064

( * ) Notice: Subject to any disclaimer, the term of this patent is extended or adjusted under 35 U.S.C. 154(b) by 36 days.

(21) Appl. No.: 10/870,364

(22) Filed: Jun. 17, 2004

(65) Prior Publication Data

US 2004/0238180 A1    Dec. 2, 2004

Related U.S. Application Data

(63) Continuation-in-part of application No. 10/345,543, filed on Jan. 16, 2003, now Pat. No. 6,766,856.

(51) Int. Cl.
*E21B 21/01* (2006.01)
*E21B 21/06* (2006.01)
*E21B 43/00* (2006.01)
*B01D 21/02* (2006.01)

(52) U.S. Cl. .................. 166/267; 166/75.12; 166/86.3; 166/386; 175/206; 175/218; 135/546; 210/532.1; 210/803

(58) Field of Classification Search ................ 166/386, 166/369, 86.3, 88.1, 81.1, 75.15, 99, 267, 166/75.12; 175/206, 216, 218; 251/63.5; 137/546; 210/800, 803, 201, 805, 747, 170, 210/251, 513, 532.1
See application file for complete search history.

(56) References Cited

U.S. PATENT DOCUMENTS

| 2,584,083 | A | * | 1/1952 | Mellett ........................ 137/238 |
| 2,632,631 | A | * | 3/1953 | Griffin et al. .................. 175/66 |
| 4,044,834 | A | | 8/1977 | Perkins ........................ 166/370 |
| 4,106,562 | A | | 8/1978 | Barnes ..................... 166/75.12 |
| 4,355,784 | A | | 10/1982 | Cain ........................... 251/63 |
| 4,406,304 | A | * | 9/1983 | Vamvakas .................... 137/544 |
| 4,503,878 | A | * | 3/1985 | Taylor .................... 137/315.02 |
| 5,020,610 | A | | 6/1991 | Lyon ........................... 175/135 |
| 5,065,787 | A | * | 11/1991 | Lochmann ............. 137/315.02 |
| 5,702,617 | A | * | 12/1997 | Price .......................... 210/803 |
| 6,394,194 | B1 | | 5/2002 | Queen ......................... 175/66 |
| 6,432,298 | B1 | | 8/2002 | Carvalko ..................... 210/86 |
| 6,557,577 | B1 | | 5/2003 | Corte ...................... 137/15.18 |
| 6,641,730 | B1 | | 11/2003 | Poole ......................... 210/300 |
| 6,648,070 | B1 | * | 11/2003 | Cove et al. ................. 166/86.1 |
| 6,766,856 | B1 | * | 7/2004 | McGee ........................ 166/267 |
| 2005/0006150 | A1 | * | 1/2005 | Sims et al. .................. 175/209 |

* cited by examiner

*Primary Examiner*—Jennifer H. Gay
(74) *Attorney, Agent, or Firm*—Buskop Law Group, P.C.; Wendy Buskop

(57) ABSTRACT

A choke for removing large diameter particulate matter from an oil or natural gas well includes a housing having a chamber with an integral solids receptacle. The chamber is in communication with a flow stream outlet and a flow stream inlet. The flow stream inlet is located below the flow stream outlet. The flow stream inlet directly adjoins the integral solids receptacle in the chamber. The choke includes a solids removal outlet located below the flow stream inlet in communication with the chamber for flowing particulate from the chamber when actuated by a user. The choke includes a needle disposed in a bonnet connected to the chamber above the flow stream inlet for controlling the flow stream from the flow stream inlet to the flow stream outlet by engaging a choke face of a seat with the needle.

46 Claims, 5 Drawing Sheets

LARGE PARTICULATE REMOVAL SYSTEM

CROSS-REFERENCE TO RELATED APPLICATIONS

The present application is a continuation-in-part of U.S. patent application Ser. No. 10/345,543 filed in the U.S. Patent and Trademark Office on Jan. 16, 2003 now U.S. Pat. No. 6,766,856.

FIELD OF THE INVENTION

An object of the invention is to remove large diameter particulates before they enter the production equipment prior to doing damage to the production equipment using a hydraulic choke mechanism. In particular, the invention relates to the removal of chunks of rock, iron ore, and other debris out of production systems for land based oil and natural gas wells, platform based oil and natural gas wells and subsea oil and natural gas wells.

BACKGROUND OF THE INVENTION

A need has existed for a device and method, which can operate at the same pressure at the well to remove large chunks of rock and/or ore. A need has existed for a device that is simple, efficient, and inexpensive to operate. Mechanical failures from flowing large diameter debris in a well stream into completion equipment are now frequent, and a need has existed to reduce the tremendous maintenance cost and down time during production and drilling of the wells. Many efforts have been made to satisfy these problems in whole or in part, but none is known to have accomplished this inexpensively and efficiently.

To one skilled in the art, this invention resides in a novel construction, combination, arrangement of parts and methods, and is more particularly defined by the appended claims. Changes in the precise embodiment are herein disclosed in the invention, and are meant to be included within the scope of the claims.

For purposes of promoting an understanding of the principles of the invention, reference will be made to the embodiments in the drawings, and specific language will be used to describe the embodiments. It will be understood that no limitation of the scope of the invention is thereby intended. Alterations and modifications of the illustrated device are contemplated; as are such further applications of the principles of the invention as would normally occur to one skilled in the art to which the invention pertains.

SUMMARY OF THE INVENTION

The invention relates to an assembly, in particular, a choke for a flow stream from a well having large diameter particulate matter. The choke is made of a housing having a chamber with an integral solids receptacle. The chamber is in communication with a flow stream outlet and a flow stream inlet with a first diameter. The flow stream inlet is located below the flow stream outlet and directly adjoins the integral solids receptacle in the chamber. A solids removal outlet is located below the flow stream inlet. The solids removal outlet is in communication with the chamber for flowing particulate from the chamber when actuated by a user. A needle in a bonnet is connected to the chamber above the flow stream inlet for controlling the flow stream from the flow stream inlet to the flow stream outlet by engaging a choke face with the needle.

The invention also relates to a choke for a flow stream from a well having large diameter particulate matter. A housing has a chamber with an integral solids receptacle. The chamber is in communication with a flow stream outlet, and a flow stream inlet. The flow stream inlet, having a first diameter, is located on a plane identical to the flow stream outlet and directly adjoins the integral solids receptacle in the chamber. A solids removal outlet is located below the flow stream inlet, and is in communication with the chamber for flowing particulate from the chamber when actuated by a user. A needle disposed in a bonnet is connected to the chamber above the flow stream inlet for controlling the flow stream from the flow stream inlet to the flow stream outlet.

The invention also relates to a method for removing large diameter particulate matter from a flow stream from an oil or natural gas well. The steps include flowing a flow stream into a flow stream inlet, in a housing, communicating with an integral solids receptacle in a chamber. The chamber is in communication with a flow stream outlet. The flow stream inlet is located on a plane below the flow stream outlet, which permits large diameter particulate matter to fall from the flow stream inlet into the integral solids receptacle forming a stream without large diameter particulate matter. The method continues by controlling the flow of the flow stream without large diameter particulate matter out of the chamber. On necessity, the method removes the large diameter particulate matter from the solids receptacle in the chamber through the solids removal outlet.

The invention also relates to a method for removing large diameter particulate matter from a flow stream from an oil or natural gas well. The steps include flowing a flow stream into a flow stream inlet, in a housing, communicating with an integral solids receptacle in a chamber. The chamber is in communication with a flow stream outlet. The flow stream inlet is located on plane identical to the flow stream outlet, which permits large diameter particulate matter to fall from the flow stream inlet into the integral solids receptacle forming a stream without large diameter particulate matter. The method continues by controlling the flow of the flow stream without large diameter particulate matter out of the chamber using a needle which removably engages a choke face and flowing the stream without large diameter particulate matter to the flow stream outlet. On necessity, the method removes the large diameter particulate matter from the solids receptacle in the chamber through the solids removal outlet.

BRIEF DESCRIPTION OF THE DRAWINGS

A specific embodiment of the invention will be described by way of example with reference to the accompanying drawings, in which.

The present invention is detailed below with reference to the listed Figures.

DETAILED DESCRIPTION OF THE PREFFERED EMBODIMENTS

Before explaining the present invention in detail, it is to be understood that the invention is not limited to the particular embodiments and that it can be practiced or carried out in various ways.

With reference to the Figures, FIG. 1, FIG. 2, FIG. 3, and FIG. 4 are representations of a choke and method for a flow stream from a well having large diameter particulate matter.

One of the benefits of this invention is that it can remove damaging solids from an oil well or natural gas stream so as not to damage down stream equipment, such as separators, pipe line and refining equipment, by inserting an integral solids receptacle into the chamber, the solids are easily and efficiently removed from the flow stream. In this design, the flow stream inlet is in one embodiment below the flow stream outlet from the choke, which makes it very difficult for heavier particles to rise up to the flow stream outlet, so using gravity and the natural circulation of the flow stream in the chamber, the large diameter particulate matter is more easily trapped in the integral solids receptacle in the chamber.

Another benefit of the invention, is that the invention can reduce the velocity of the flow stream between 3 and 5 times the initial intake into the housing of a choke. The benefit of the reduction of the velocity of the flow stream is again to restrict the ability of the large diameter particulate to reach the flow stream outlet, and drop out of the flow stream into the solids receptacle in the chamber of the housing of the choke.

Environmentally, the removal of large diameter particulate matter at this stream stops damage to equipment which can cause leakage into the environment, or explosions which can harm people down stream. Pollution from leakage caused by large particles jamming up pipelines is a serious problem, and the toxic clean up can be expensive and harmful to wildlife. The invention is designed to reduce these hazards and help solve these problems.

Figure 1:
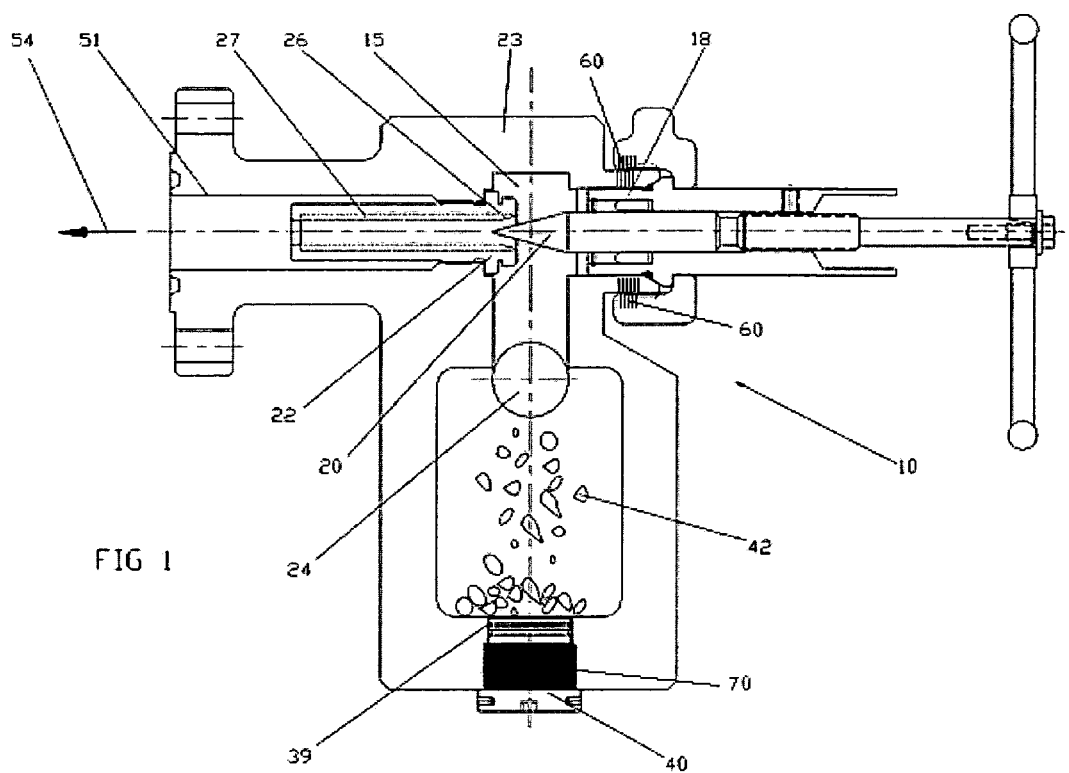
FIG. 1 is a side view of the choke.

FIG. 1 depicts the side view of a choke (10) for a flow stream (50) from a well such as an oil or natural gas well having large diameter particulate matter (42). Typically, flow streams from these wells have a velocity up to 50 million cubic feet per day or even greater depending on the size of the well. The choke (10) can be a manual or a hydraulic choke and sustain up to 20,000 psi, typically between 5000 and 20,000 psi during operation. Examples of hydraulic chokes usable with this invention are those produced by Schooner Petroleum Service of Houston, Tex.

Large diameter particulate matter (42) have a diameter equivalent to or less than the diameter of the flow stream inlet (24). This diameter is termed hereafter the first diameter (28). The large diameter particulate matter (42) can be rock, iron pieces, rubber, composite materials or combinations thereof.

The choke (10) includes a housing (23) having a chamber (15) with an integral solids receptacle (30). The housing (23) can be made of steel, stainless steel, alloys thereof, coated steel or combinations thereof.

The chamber (15) is in communication with a flow stream outlet (51), and a flow stream inlet (24) having a first diameter (28). The chamber (15) can be between 3 to 5 times the diameter of the flow stream inlet (24). Typically the chamber (15) with integral solids receptacle (30) would hold between about 0.5 and 4 gallons of fluid.

In one embodiment, the flow stream inlet (24) is located in a plane below the flow stream outlet (51) as shown in FIG. 1, and directly adjoins the integral solids receptacle (30) in the chamber (15). The flow stream inlet (24) is preferably between 2 inches and 4 inches in diameter.

Also included is a solids removal outlet (39) located below the flow stream inlet (24) in communication with the chamber (15) for flowing large diameter particulate matter (42) from the chamber (15) when actuated by a user (53). An outlet plug (40) can be inserted in one embodiment into the solids removal outlet (39) and can be made of the same material as the housing (23). FIG. 1 shows element (70) as the threads for the threaded engagement between the outlet plug (40) and the solids removal outlet (39).

FIG. 1 further depicts an outlet plug (40) which is connected to the solids removal outlet (39), and can be in a threaded engagement with the solids removal outlet (39). The choke (10) may in another embodiment include a sleeve (27) that is a different and harder material than the housing (23). The sleeve (27) can comprise a tungsten carbide, a steel, similar hard material, or combinations thereof. The sleeve is expected to be between about $\frac{1}{8}$ inch and $\frac{3}{8}$ inch, preferably $\frac{1}{4}$ inch in thickness.

The sleeve can be 6 inches long, or at least as long as the flow stream outlet (51).

Figure 1A:
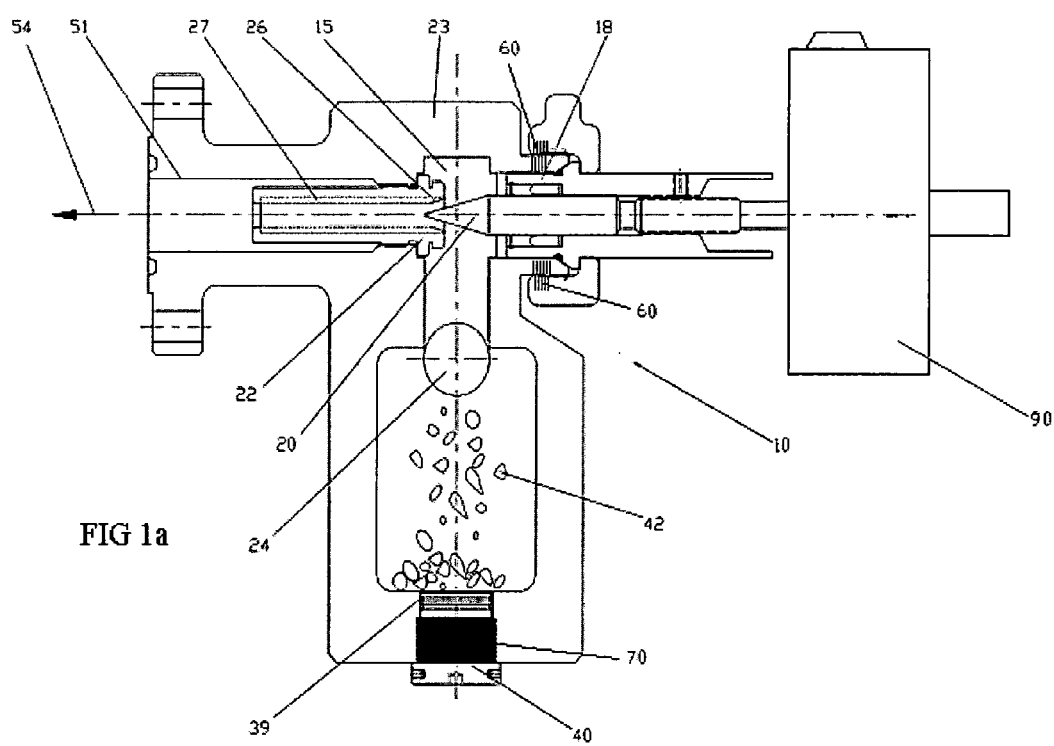
FIG. 1a is a side view of an embodiment with a hydraulic choke.

FIG. 1 further depicts a needle (20) disposed in a bonnet (18). The needle (20) engages a choke face (26). In this embodiment, the bonnet and needle are connected to the chamber (15) above the flow stream inlet (24) for controlling the flow stream (50) from the flow stream inlet (24) to the flow stream outlet (51). The choke face (26) is in a seat (22) in a preferred embodiment. The choke face, when closed can provide a sealing engagement with the needle. The needle (20) can be a hydraulically actuated needle for removably engaging the choke face (26), or mechanically engaged using a hand wheel (52). The bonnet (18) is in a threaded engagement with the housing (23) to hold the needle (20). In an alternative embodiment, the flow stream inlet (24) can be in the same plane as the flow stream outlet (51) and in that embodiment, the needle and bonnet are connected to the chamber in the same plane as the flow stream outlet. FIG. 1 shows element (60) as the threads for the threaded engagement between the bonnet (18) and housing (23). FIG. 1 shows the cleaned flow stream (54). A hydraulic choke actuator (90) is also depicted in FIG. 1a.

Figure 2:
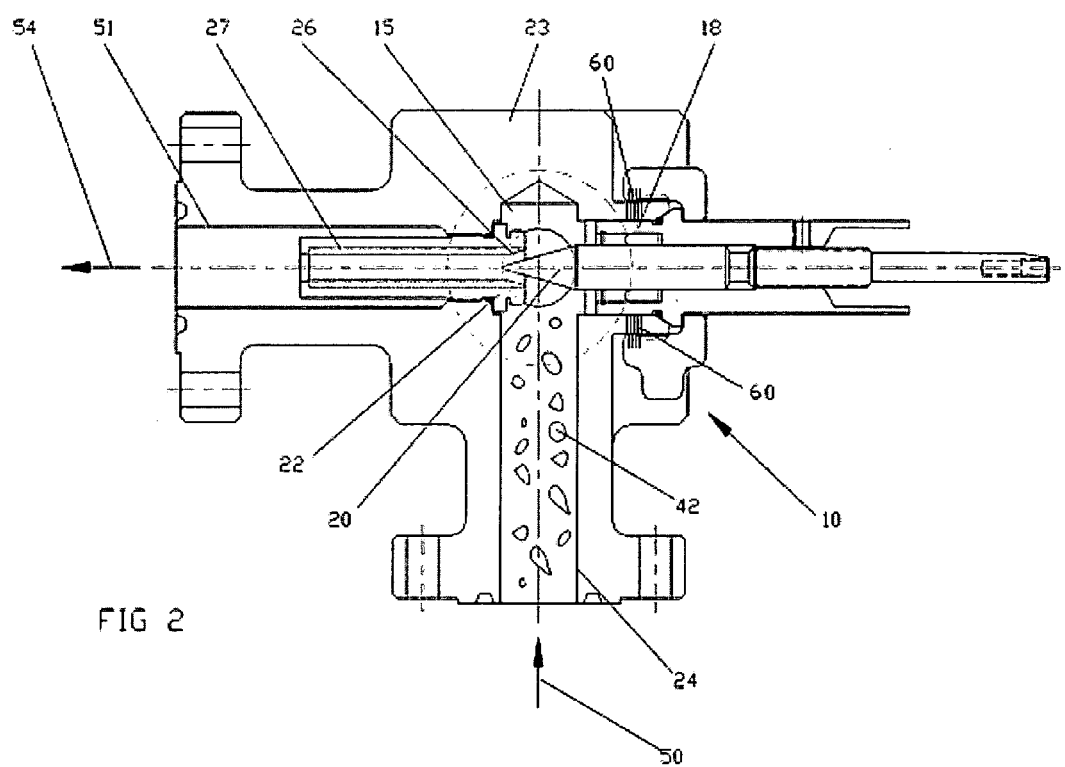
FIG. 2 is a top view of the choke.

FIG. 2 depicts the top view of the choke (10) for a flow stream (50) from a well such as an oil or natural gas well having large diameter particulate matter (42) as shown in FIG. 1.

The choke (10) includes a housing (23) having a chamber (15). The chamber (15) is in communication with a flow stream outlet (51) and a flow stream inlet (24) with a first diameter (28). The flow stream inlet (24) is located in a plane below the flow stream outlet (51).

FIG. 2 further depicts a needle (20) disposed in a bonnet (18) is connected to the chamber (15) above the flow stream inlet (24) for controlling the flow stream (50) from the flow stream inlet (24) to the flow stream outlet (51) by engaging a choke face (26) with the needle (20). The choke face has a seat (22). FIG. 2 shows element (60) as the threads for the threaded engagement between the bonnet (18) and housing (23). FIG. 2 shows the cleaned flow stream (54).

In an alternative embodiment, the flow stream inlet can be on the same or identical plane as the flow stream outlet.

Figure 3:
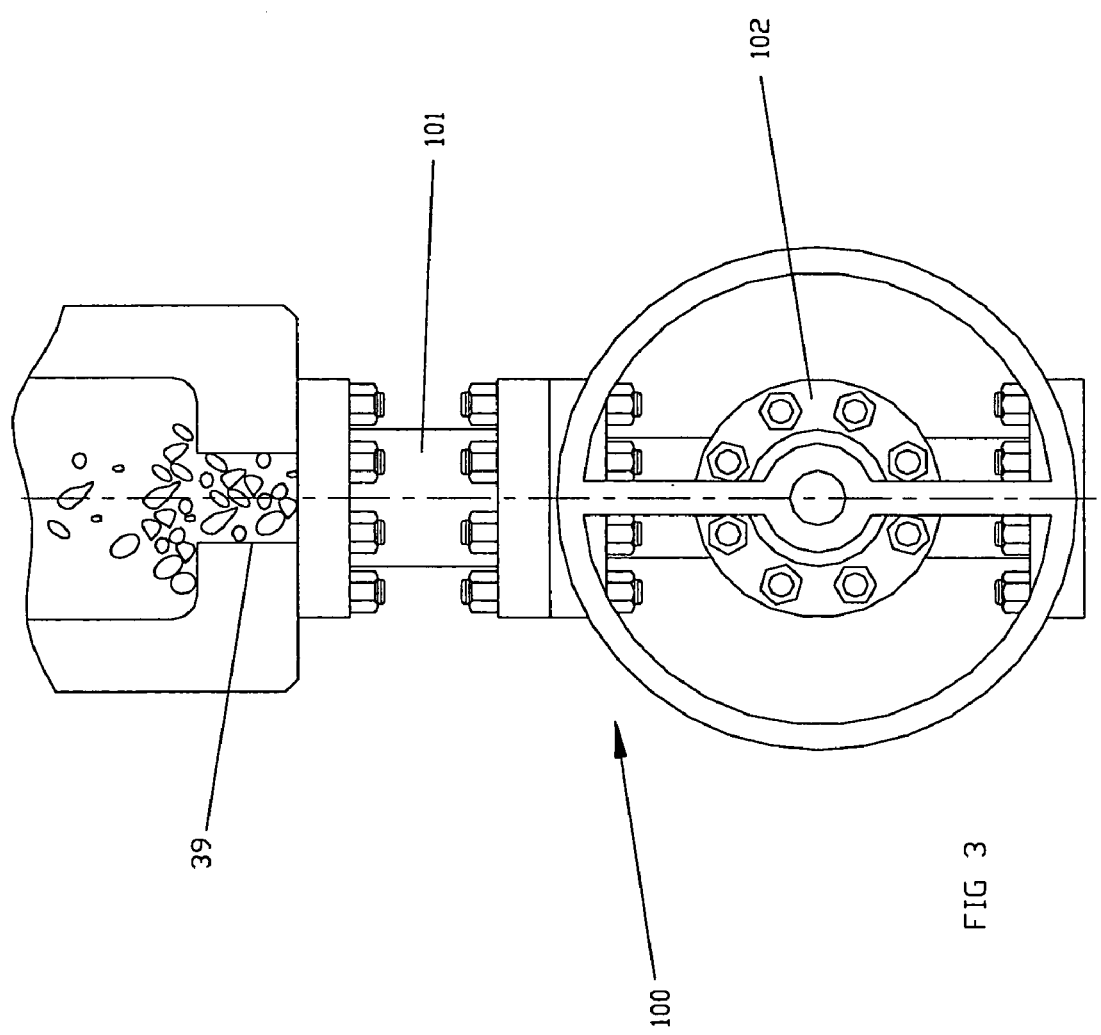
FIG. 3 is the dump device according to the invention.

FIG. 3 depicts a dump device (100) which can be used instead of the outlet plug (40) as an alternative embodiment. The dump device (100) is connected to the solids removal outlet (39). The dump device (100) includes a pipe (101) connected to the solids removal outlet (39) and a controllable valve (102) for controlling flow out of the solids removal outlet (39). An example of a usable controllable valve would be a gate or plug valve made by Schooner Petroleum Services of Houston, Tex., Halliburton or Cameron gate valve of Houston, Tex. The controllable valve (102) could also be another choke. The pipe can have a diameter of between about 2 inches and 4 inches and is made out the same material as the housing. The dump device (100) can be flanged to the solids removal outlet, but it could be a studded engagement, threaded engagement or clamped to the solids removal outlet (39). The dump device (100) could be an automatically actuating dump device based on a sensor which determines the quantity of large diameter particulate matter (42) in the solids removal outlet (39). The dump device (100) could be solar operated using solar panels or could be connected to batteries or another power source. The dump device (100) can be operated by a user (53) for intermittent dumping of the large diameter particulate matter (42).

Figure 4:
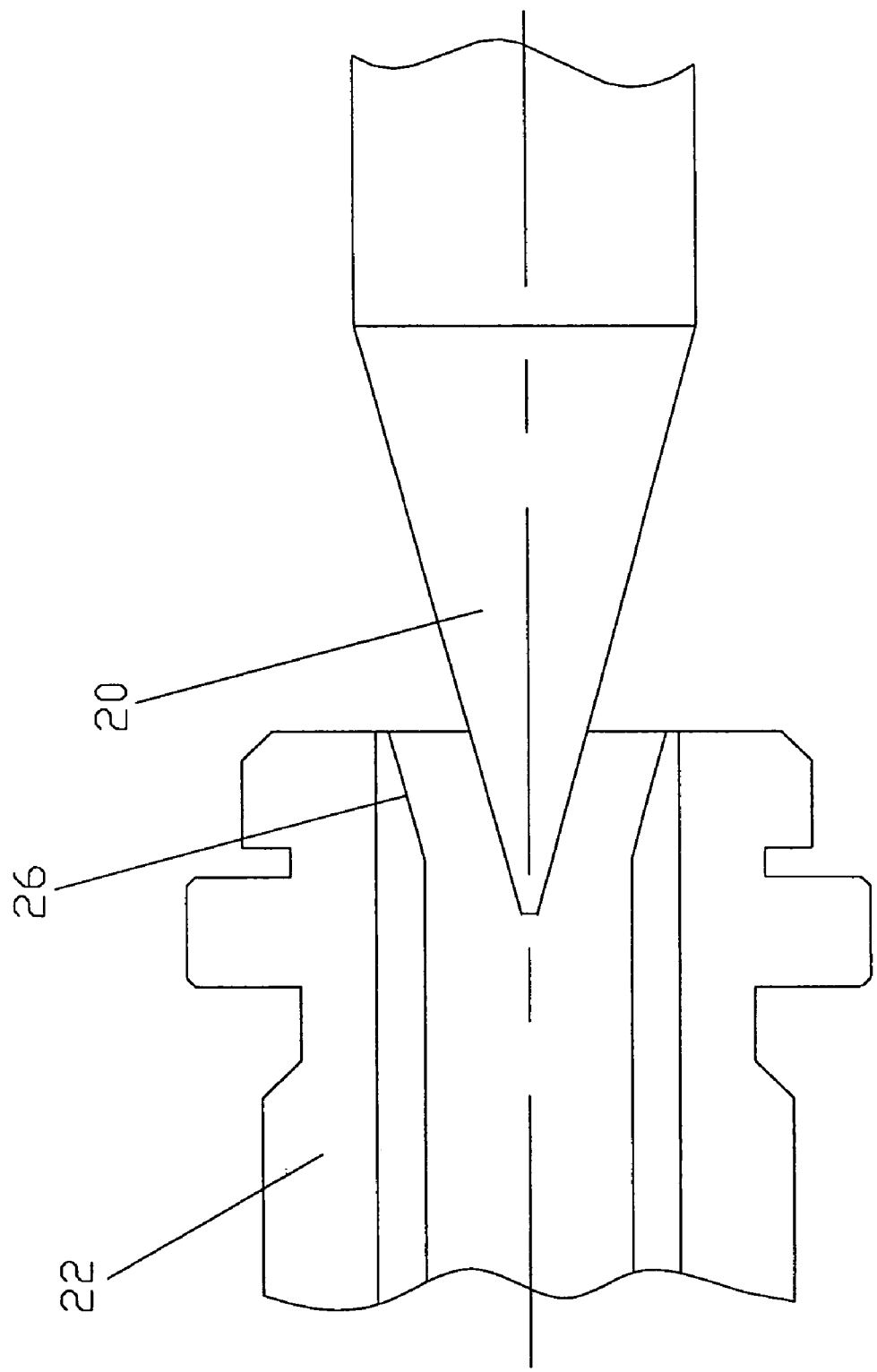
FIG. 4 is a detail of the needle engaging the choke face depicted in FIG. 1.

FIG. 4 depicts a detailed view of the needle (20) engaging the choke face (26) with the seat (22). The needle (20) and choke face (26) are ground and polished so that upon mating form a positive seal for complete shut off.

The invention also relates to a method for removing large diameter particulate matter (42) from a flow stream (50) from an oil or natural gas well, which includes flowing a flow stream (50) into a flow stream inlet (24) with a first diameter (28) communicating with an integral solids receptacle (30) in a chamber (15). The flow stream is from a production well, drilling well or combinations thereof. The velocity of the flow stream is reduced significant as it moves from the flow stream inlet (24) to the flow stream outlet (51), and is reduced between about 3 and 5 times from the flow velocity at the flow stream inlet (24) to the flow velocity at the flow stream outlet (51).

The chamber (15) is in communication with a flow stream outlet (51) and the flow stream inlet (24) is located on a plane below the flow stream outlet (51). The method also permits large diameter particulate matter (42) to fall from the flow stream inlet (24) into the integral solids receptacle (30). A stream is formed without large diameter particulate matter (42). This stream is then flowed to the flow stream outlet. A needle (20) and choke face (26) are used to control the flow of the flow stream, which is a hydrocarbon stream without large diameter particulate solids out of the chamber (15) to the flow stream outlet.

The method allows, periodically, interrupting the flow stream by engaging the needle (20) with the choke face (26) to remove additional large diameter particulate matter (42) which are still circulating in the chamber (15). On necessity, the method allows removing the large diameter particulate matter (42) from the integral solids receptacle (30) in the chamber (15) through the solids removal outlet (39). Additionally, the method allows for a step of forming a sealing engagement between the choke face (26) and the needle (20) using a seat (22).

In an alternative embodiment, the method allows for the chamber to be in communication with a flow stream outlet (51), and the flow stream inlet (24) is located on a same plane or is identical to the flow stream outlet (51).

While this invention has been described with emphasis on the preferred embodiments, it should be understood that within the scope of the appended claims, the invention might be practiced other than as specifically described herein.

PARTS LIST choke (10)
large diameter particulate matter (42)
housing (23)
chamber (15)
integral solids receptacle (30)
flow stream outlet (51)
flow stream inlet (24)
solids removal outlet (39)
needle (20)
bonnet (18)
flow stream (50)
choke face (26)
seat (22)
outlet plug (40)
dump device (100)
pipe (101)
controllable valve (102)
hand wheel (52)
sleeve (27)
first diameter (28)
stream without large diameter particulate matter (42)
user (53)
cleaned flow stream (54)

What is claimed is:

1. A choke for a flow stream from a well producing large diameter particulate matter comprising:
   a. a housing having a chamber with an integral solids receptacle wherein the chamber is in communication with a flow stream outlet and a flow stream inlet with a first diameter, and wherein the flow stream inlet is located below the flow stream outlet and directly adjoins the integral solids receptacle in the chamber;
   b. a solids removal outlet located below the flow stream inlet in communication with the chamber, wherein the solids removal outlet is for removing large diameter particulate matter from the chamber when actuated; and
   c. a needle disposed in a bonnet in communication with the chamber above the flow stream inlet for controlling the flow stream from the flow stream inlet to the flow stream outlet by engaging a choke face.

2. The choke of claim 1, wherein the choke is a manual or a hydraulic choke.

3. The choke of claim 1, wherein the flow stream inlet has a diameter between 2 inches and 4 inches.

4. The choke of claim 1, wherein the chamber diameter is between 3 and 5 times the diameter of the flow stream inlet.

5. The choke of claim 1, wherein an outlet plug is connected to the solids removal outlet.

6. The choke of claim 5, wherein the outlet plug is in a threaded engagement with the solids removal outlet.

7. The choke of claim 1, wherein the bonnet is in a threaded engagement with the housing.

8. The choke of claim 1, further comprising a hand wheel attached to the needle for removably engaging onto the choke face.

9. The choke of claim 1, wherein the choke face further comprises a sleeve of a different and harder material than the housing.

10. The choke of claim 9, wherein the sleeve is composed of a member selected from the group consisting of a tungsten carbide, a steel, a tungsten or similar hard material, and combinations thereof.

11. The choke of claim 1, wherein the needle is a hydraulically actuated needle for removably engaging the choke face.

12. The choke of claim 1, wherein the housing is composed of a member selected from the group consisting of a steel, stainless steel, alloys thereof, coated steel and combinations thereof.

13. The choke of claim 1, wherein the large diameter particulate matter has a diameter equivalent to or less than the first diameter.

14. The choke of claim 1, wherein the large diameter particulate matter is a member selected from the group consisting of rock, iron pieces, rubber, composite materials and, combinations thereof.

15. The choke of claim 1, wherein the choke is adapted to sustain pressure up to 20,000 psi during operation.

16. The choke of claim 1, wherein the choke face further comprises a seat for forming a sealing engagement with the needle.

17. A choke for a flow stream from a well producing large diameter particulate matter comprising:
   a. a housing having a chamber with an integral solids receptacle wherein the chamber is in communication with a flow stream outlet and a flow stream inlet with a first diameter, and wherein the flow stream inlet is located below the flow stream outlet and directly adjoins the integral solids receptacle in the chamber;
   b. a solids removal outlet located below the flow stream inlet in communication with the chamber, wherein the solids removal outlet is for removing large diameter particulate matter from the chamber when actuated; and
   c. a needle disposed in a bonnet in communication with the chamber above the flow stream inlet for controlling the flow stream from the flow stream inlet to the flow stream outlet by engaging a choke face;
   d. a dump device connected to the solids removal outlet, wherein the dump device comprises a pipe connected to the solids removal outlet and a controllable valve connected to the pipe for controlling removal of large diameter particulate matter out of the solids removal outlet.

18. A choke for a flow stream from a well producing large diameter particulate matter comprising:
   a. a housing having a chamber with an integral solids receptacle wherein the chamber is in communication with a flow stream outlet, and a flow stream inlet coming from a well head with a first diameter located on a plane identical to the flow stream outlet and directly adjoining the integral solids receptacle;
   b. a solids removal outlet located below the flow stream inlet in communication with the chamber wherein the solids removal outlet is for removing large diameter particulate matter from the chamber when actuated; and
   c. a needle disposed in a bonnet in communication with the chamber above the flow stream inlet for controlling the flow stream from the flow stream inlet to the flow stream outlet by engaging a choke face.

19. The choke of claim 18, wherein the choke is a manual choke or a hydraulic choke.

20. The choke of claim 18, wherein the flow stream inlet has a diameter between 2 inches and 4 inches.

21. The choke of claim 18, wherein the chamber diameter is between 3 and 5 times the diameter of the flow stream inlet.

22. The choke of claim 18, wherein an outlet plug is connected to the solids removal outlet.

23. The choke of claim 22, wherein the outlet plug is in a threaded engagement with the solids removal outlet.

24. The choke of claim 18, wherein the bonnet is in a threaded engagement with the housing.

25. The choke of claim 18, further comprising a hand wheel attached to the needle for removably engaging the choke face.

26. The choke of claim 18, wherein the choke face further comprises a sleeve of a different and harder material than the housing.

27. The choke of claim 26, wherein the sleeve is composed of a member selected from the group consisting of a tungsten carbide, a steel or similar hard material and combinations thereof.

28. The choke of claim 18, wherein the needle is a hydraulically actuated needle for removably engaging the choke face.

29. The choke of claim 18, wherein the housing is composed of a member selected from the group consisting of a steel, stainless steel, coated steel, alloys thereof and combinations thereof.

30. The choke of claim 18, wherein the large diameter particulate matter has a diameter equivalent to or less than the first diameter.

31. The choke of claim 18, wherein the large diameter particulate matter is a member selected from the group consisting of rock, iron. pieces, rubber, composite materials and combinations thereof.

32. The choke of claim 18, wherein the choke is adapted to sustain a pressure up to 20,000 psi during operation.

33. The choke of claim 18, wherein the choke face further comprises a seat for forming a sealing engagement with the needle.

34. A choke for a flow stream from a well producing large diameter particulate matter comprising:
   a. a housing having a chamber with an integral solids receptacle wherein the chamber is in communication with a flow stream outlet, and a flow stream inlet with a first diameter located on a plane identical to the flow stream outlet and directly adjoining the integral solids receptacle;
   b. a solids removal outlet located below the flow stream inlet in communication with the chamber wherein the solids removal outlet is for removing large diameter particulate matter from the chamber when actuated; and
   c. a needle disposed in a bonnet in communication with the chamber above the flow stream inlet for controlling the flow stream from the flow stream inlet to the flow stream outlet by engaging a choke face; and
   d. a dump device connected to the solids removal outlet, wherein the dump device comprises a pipe connected to the solids removal outlet and a controllable valve connected to the pipe for controlling removal of large diameter particulate matter flow out of the solids removal outlet.

35. A method for removing large diameter particulate matter from a flow stream produced from an oil or natural gas well comprising the steps of:
   a. flowing a flow stream into a flow stream inlet of a housing with a first diameter, wherein the flow stream inlet communicates with an integral solids receptacle in a chamber, and wherein the chamber is in communication with a flow stream outlet, and the flow stream inlet is located on a plane below the flow stream outlet;
   b. permitting large diameter particulate matter to fall from the flow stream inlet into the integral solids receptacle forming a stream without large diameter particulate matter;
   c. controlling the flow of the stream without large diameter particulate matter out of the chamber using a needle which removably engages a choke face, and flowing the stream without large diameter particulate matter to the flow stream outlet; and d. removing the large diameter particulate matter from the solids receptacle in the chamber through the solids removal outlet.

36. The method of claim 35 wherein said flow stream is from a member selected from the group consisting of a production well, drilling well and combinations thereof.

37. The method of claim 35 wherein the velocity of the flow stream is reduced significantly as the flow stream moves from the flow stream inlet to the flow stream outlet.

38. The method of claim method 37, wherein the velocity of the flow stream is reduced between 3 and 5 times in the housing.

39. The method of claim method 35, further comprising the step of periodically interrupting the flow stream by engaging the needle with the choke face to remove additional large diameter particulate matter still circulating in the chamber.

40. The method of claim 35, further comprising the step of forming a sealing engagement between the needle and the choke face.

41. A method for removing large diameter particulate matter from a flow stream from an oil or natural gas well comprising the steps of:

a. flowing a flow stream from a well into a flow stream inlet of a housing with a first diameter wherein the flow stream inlet communicates with an integral solids receptacle in a chamber, and wherein the chamber is in communication with a flow stream outlet, and the flow stream inlet is located on a plane identical to the flow stream outlet;

b. permitting large diameter particulate matter to fall from the flow stream inlet into the integral solids receptacle forming a stream without large diameter particulate matter;

c. controlling the flow of the flow stream without large diameter particulate matter out of the chamber using a needle which removably engages a choke face, and flowing the stream without large diameter particulate matter to the flow stream outlet; and d. removing the large diameter particulate matter from the solids receptacle in the chamber through the solids removal outlet.

42. The method of claim 41, wherein said flow stream is from a member selected from the group consisting of a production well, drilling well and combinations thereof.

43. The method of claim 41 wherein the velocity of the flow stream is reduced significantly as the flow stream moves from the flow stream inlet to the flow stream outlet.

44. The method of claim method 43, wherein the velocity of the flow stream is reduced between 3 and 5 times in the housing.

45. The method of claim method 41, further comprising the step of periodically interrupting the flow stream by engaging the needle with the choke face to remove additional large diameter particulate matter still circulating in the chamber.

46. The method of claim 41, further comprising the step of forming a sealing engagement between the needle and the choke face.

* * * * *